United States Patent
Ben-Shlomo et al.

(10) Patent No.: US 11,792,776 B2
(45) Date of Patent: **\*Oct. 17, 2023**

(54) TIME-DIVISION DUPLEXING (TDD) IN DISTRIBUTED COMMUNICATIONS SYSTEMS, INCLUDING DISTRIBUTED ANTENNA SYSTEMS (DASS)

(71) Applicant: Corning Optical Communications LLC, Charlotte, NC (US)

(72) Inventors: Dror Ben-Shlomo, Modiin Makabim Reut (IL); Isaac Shapira, Petach Tikva (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,900

(22) Filed: Mar. 10, 2022

(65) Prior Publication Data

US 2022/0201683 A1 Jun. 23, 2022

Related U.S. Application Data

(63) Continuation of application No. 16/842,314, filed on Apr. 7, 2020, now Pat. No. 11,291,001, which is a
(Continued)

(51) Int. Cl.
*H04W 72/0446* (2023.01)
*H04B 1/48* (2006.01)
(Continued)

(52) U.S. Cl.
CPC .......... *H04W 72/0446* (2013.01); *H04B 1/48* (2013.01); *H04L 5/14* (2013.01); *H04W 72/20* (2023.01); *H04B 17/318* (2015.01)

(58) Field of Classification Search
CPC .......... H04W 72/0446; H04W 72/0406; H04L 5/14; H04B 1/48; H04B 17/318
See application file for complete search history.

(56) References Cited

U.S. PATENT DOCUMENTS 4,365,865 A 12/1982 Stiles
4,449,246 A 5/1984 Seiler et al.
(Continued)

FOREIGN PATENT DOCUMENTS

AU 06451/92 B2 1/1994
AU 07311/80 B2 3/2001
(Continued)

OTHER PUBLICATIONS

Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
(Continued)

*Primary Examiner* — Shailendra Kumar
(74) *Attorney, Agent, or Firm* — William D. Doyle

(57) ABSTRACT

Time-division duplexing (TDD) in distributed communications systems, including distributed antenna systems (DASs) is disclosed. In one embodiment, a control circuit is provided and configured to control the TDD transmit mode of a DAS to control the allocation of time slots for uplink and downlink communications signal distribution in respective uplink path(s) and downlink path(s). The control circuit includes separate power detectors configured to detect either a transmit power level in a downlink path or a receive power level in an uplink path. If the transmit power detected in the downlink path is greater than receive power detected in the uplink path, the control circuit switches the TDD transmit mode to the downlink direction. In this manner, the control circuit does not have to control the TDD transmit mode
(Continued)

based solely on detected power in the downlink path, where a directional coupler may leak uplink power in the downlink path.

20 Claims, 4 Drawing Sheets

Related U.S. Application Data continuation of application No. 16/374,389, filed on Apr. 3, 2019, now Pat. No. 10,694,519, which is a continuation of application No. 15/975,153, filed on May 9, 2018, now Pat. No. 10,257,828, which is a continuation of application No. 14/962,338, filed on Dec. 8, 2015, now Pat. No. 9,974,074, which is a continuation of application No. PCT/IL2014/050526, filed on Jun. 11, 2014.

(60) Provisional application No. 61/834,075, filed on Jun. 12, 2013.

(51) Int. Cl.
*H04W 72/20* (2023.01)
*H04L 5/14* (2006.01)
*H04B 17/318* (2015.01)

(56) References Cited

U.S. PATENT DOCUMENTS

| | | |
|---|---|---|
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |

(56) References Cited

U.S. PATENT DOCUMENTS

| | | | |
|---|---|---|---|
| 6,150,921 | A | 11/2000 | Werb et al. |
| 6,157,810 | A | 12/2000 | Georges et al. |
| 6,192,216 | B1 | 2/2001 | Sabat et al. |
| 6,194,968 | B1 | 2/2001 | Winslow |
| 6,212,397 | B1 | 4/2001 | Langston et al. |
| 6,222,503 | B1 | 4/2001 | Gietema et al. |
| 6,223,201 | B1 | 4/2001 | Reznak |
| 6,232,870 | B1 | 5/2001 | Garber et al. |
| 6,236,789 | B1 | 5/2001 | Fitz |
| 6,236,863 | B1 | 5/2001 | Waldroup et al. |
| 6,240,274 | B1 | 5/2001 | Izadpanah |
| 6,246,500 | B1 | 6/2001 | Ackerman |
| 6,268,946 | B1 | 7/2001 | Larkin et al. |
| 6,275,990 | B1 | 8/2001 | Dapper et al. |
| 6,279,158 | B1 | 8/2001 | Geile et al. |
| 6,286,163 | B1 | 9/2001 | Trimble |
| 6,292,673 | B1 | 9/2001 | Maeda et al. |
| 6,295,451 | B1 | 9/2001 | Mimura |
| 6,301,240 | B1 | 10/2001 | Slabinski et al. |
| 6,307,869 | B1 | 10/2001 | Pawelski |
| 6,314,163 | B1 | 11/2001 | Acampora |
| 6,317,599 | B1 | 11/2001 | Rappaport et al. |
| 6,323,980 | B1 | 11/2001 | Bloom |
| 6,324,391 | B1 | 11/2001 | Bodell |
| 6,330,241 | B1 | 12/2001 | Fort |
| 6,330,244 | B1 | 12/2001 | Swartz et al. |
| 6,334,219 | B1 | 12/2001 | Roberts et al. |
| 6,336,021 | B1 | 1/2002 | Nukada |
| 6,336,042 | B1 | 1/2002 | Dawson et al. |
| 6,337,754 | B1 | 1/2002 | Imajo |
| 6,340,932 | B1 | 1/2002 | Rodgers et al. |
| 6,353,406 | B1 | 3/2002 | Lanzl et al. |
| 6,353,600 | B1 | 3/2002 | Schwartz et al. |
| 6,359,714 | B1 | 3/2002 | Imajo |
| 6,370,203 | B1 | 4/2002 | Boesch et al. |
| 6,374,078 | B1 | 4/2002 | Williams et al. |
| 6,374,124 | B1 | 4/2002 | Slabinski |
| 6,389,010 | B1 | 5/2002 | Kubler et al. |
| 6,400,318 | B1 | 6/2002 | Kasami et al. |
| 6,400,418 | B1 | 6/2002 | Wakabayashi |
| 6,404,775 | B1 | 6/2002 | Leslie et al. |
| 6,405,018 | B1 | 6/2002 | Reudink et al. |
| 6,405,058 | B2 | 6/2002 | Bobier |
| 6,405,308 | B1 | 6/2002 | Gupta et al. |
| 6,414,624 | B2 | 7/2002 | Endo et al. |
| 6,415,132 | B1 | 7/2002 | Sabat, Jr. |
| 6,421,327 | B1 | 7/2002 | Lundby et al. |
| 6,438,301 | B1 | 8/2002 | Johnson et al. |
| 6,438,371 | B1 | 8/2002 | Fujise et al. |
| 6,448,558 | B1 | 9/2002 | Greene |
| 6,452,915 | B1 | 9/2002 | Jorgensen |
| 6,459,519 | B1 | 10/2002 | Sasai et al. |
| 6,459,989 | B1 | 10/2002 | Kirkpatrick et al. |
| 6,477,154 | B1 | 11/2002 | Cheong et al. |
| 6,480,702 | B1 | 11/2002 | Sabat, Jr. |
| 6,486,907 | B1 | 11/2002 | Farber et al. |
| 6,496,290 | B1 | 12/2002 | Lee |
| 6,501,965 | B1 | 12/2002 | Lucidarme |
| 6,504,636 | B1 | 1/2003 | Seto et al. |
| 6,504,831 | B1 | 1/2003 | Greenwood et al. |
| 6,512,478 | B1 | 1/2003 | Chien |
| 6,519,395 | B1 | 2/2003 | Bevan et al. |
| 6,519,449 | B1 | 2/2003 | Zhang et al. |
| 6,525,855 | B1 | 2/2003 | Westbrook et al. |
| 6,535,330 | B1 | 3/2003 | Lelic et al. |
| 6,535,720 | B1 | 3/2003 | Kintis et al. |
| 6,549,772 | B1 | 4/2003 | Chavez et al. |
| 6,556,551 | B1 | 4/2003 | Schwartz |
| 6,577,794 | B1 | 6/2003 | Currie et al. |
| 6,577,801 | B2 | 6/2003 | Broderick et al. |
| 6,580,402 | B2 | 6/2003 | Navarro et al. |
| 6,580,905 | B1 | 6/2003 | Naidu et al. |
| 6,580,918 | B1 | 6/2003 | Leickel et al. |
| 6,583,763 | B2 | 6/2003 | Judd |
| 6,587,514 | B1 | 7/2003 | Wright et al. |
| 6,594,496 | B2 | 7/2003 | Schwartz |
| 6,597,325 | B2 | 7/2003 | Judd et al. |
| 6,598,009 | B2 | 7/2003 | Yang |
| 6,606,430 | B2 | 8/2003 | Bartur et al. |
| 6,615,074 | B2 | 9/2003 | Mickle et al. |
| 6,628,732 | B1 | 9/2003 | Takaki |
| 6,634,811 | B1 | 10/2003 | Gertel et al. |
| 6,636,747 | B2 | 10/2003 | Harada et al. |
| 6,640,103 | B1 | 10/2003 | Inman et al. |
| 6,643,437 | B1 | 11/2003 | Park |
| 6,652,158 | B2 | 11/2003 | Bartur et al. |
| 6,654,590 | B2 | 11/2003 | Boros et al. |
| 6,654,616 | B1 | 11/2003 | Pope et al. |
| 6,657,535 | B1 | 12/2003 | Magbie et al. |
| 6,658,269 | B1 | 12/2003 | Golemon et al. |
| 6,665,308 | B1 | 12/2003 | Rakib et al. |
| 6,670,930 | B2 | 12/2003 | Navarro |
| 6,674,966 | B1 | 1/2004 | Koonen |
| 6,675,294 | B1 | 1/2004 | Gupta et al. |
| 6,678,509 | B2 | 1/2004 | Skarman et al. |
| 6,687,437 | B1 | 2/2004 | Starnes et al. |
| 6,690,328 | B2 | 2/2004 | Judd |
| 6,701,137 | B1 | 3/2004 | Judd et al. |
| 6,704,298 | B1 | 3/2004 | Matsumiya et al. |
| 6,704,545 | B1 | 3/2004 | Wala |
| 6,710,366 | B1 | 3/2004 | Lee et al. |
| 6,714,800 | B2 | 3/2004 | Johnson et al. |
| 6,731,880 | B2 | 5/2004 | Westbrook et al. |
| 6,745,013 | B1 | 6/2004 | Porter et al. |
| 6,758,913 | B1 | 7/2004 | Tunney et al. |
| 6,763,226 | B1 | 7/2004 | McZeal, Jr. |
| 6,771,862 | B2 | 8/2004 | Karnik et al. |
| 6,771,933 | B1 | 8/2004 | Eng et al. |
| 6,784,802 | B1 | 8/2004 | Stanescu |
| 6,785,558 | B1 | 8/2004 | Stratford et al. |
| 6,788,666 | B1 | 9/2004 | Linebarger et al. |
| 6,801,767 | B1 | 10/2004 | Schwartz et al. |
| 6,807,374 | B1 | 10/2004 | Imajo et al. |
| 6,812,824 | B1 | 11/2004 | Goldinger et al. |
| 6,812,905 | B2 | 11/2004 | Thomas et al. |
| 6,823,174 | B1 | 11/2004 | Masenten et al. |
| 6,826,163 | B2 | 11/2004 | Mani et al. |
| 6,826,164 | B2 | 11/2004 | Mani et al. |
| 6,826,337 | B2 | 11/2004 | Linnell |
| 6,836,660 | B1 | 12/2004 | Wala |
| 6,836,673 | B1 | 12/2004 | Trott |
| 6,842,433 | B2 | 1/2005 | West et al. |
| 6,847,856 | B1 | 1/2005 | Bohannon |
| 6,850,510 | B2 | 2/2005 | Kubler et al. |
| 6,865,390 | B2 | 3/2005 | Goss et al. |
| 6,873,823 | B2 | 3/2005 | Hasarchi et al. |
| 6,876,056 | B2 | 4/2005 | Tilmans et al. |
| 6,879,290 | B1 | 4/2005 | Toutain et al. |
| 6,882,311 | B2 | 4/2005 | Walker et al. |
| 6,883,710 | B2 | 4/2005 | Chung |
| 6,885,344 | B2 | 4/2005 | Mohamadi |
| 6,885,846 | B1 | 4/2005 | Panasik et al. |
| 6,889,060 | B2 | 5/2005 | Fernando et al. |
| 6,909,399 | B1 | 6/2005 | Zegelin et al. |
| 6,915,058 | B2 | 7/2005 | Pons |
| 6,915,529 | B1 | 7/2005 | Suematsu et al. |
| 6,919,858 | B2 | 7/2005 | Rofougaran |
| 6,920,330 | B2 | 7/2005 | Caronni et al. |
| 6,924,997 | B2 | 8/2005 | Chen et al. |
| 6,930,987 | B1 | 8/2005 | Fukuda et al. |
| 6,931,183 | B2 | 8/2005 | Panak et al. |
| 6,931,659 | B1 | 8/2005 | Kinemura |
| 6,933,849 | B2 | 8/2005 | Sawyer |
| 6,934,511 | B1 | 8/2005 | Lovinggood et al. |
| 6,934,541 | B2 | 8/2005 | Miyatani |
| 6,941,112 | B2 | 9/2005 | Hasegawa |
| 6,946,989 | B2 | 9/2005 | Vavik |
| 6,961,312 | B2 | 11/2005 | Kubler et al. |
| 6,963,289 | B2 | 11/2005 | Aljadeff et al. |
| 6,963,552 | B2 | 11/2005 | Sabat et al. |
| 6,965,718 | B2 | 11/2005 | Koertel |
| 6,967,347 | B2 | 11/2005 | Estes et al. |
| 6,968,107 | B2 | 11/2005 | Belardi et al. |
| 6,970,652 | B2 | 11/2005 | Zhang et al. |

(56) References Cited

U.S. PATENT DOCUMENTS

| | | |
|---|---|---|
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace et al. |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks et al. |
| 7,653,397 B2 | 1/2010 | Pernu et al. |
| 7,668,565 B2 | 2/2010 | Ylaenen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,844,182 B2 | 11/2010 | Mostert et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |

(56) References Cited

U.S. PATENT DOCUMENTS

| | | |
|---|---|---|
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,213,401 B2 | 7/2012 | Fischer et al. |
| 8,223,795 B2 | 7/2012 | Cox et al. |
| 8,238,463 B1 | 8/2012 | Arslan et al. |
| 8,270,387 B2 | 9/2012 | Cannon et al. |
| 8,290,483 B2 | 10/2012 | Sabat et al. |
| 8,306,563 B2 | 11/2012 | Zavadsky et al. |
| 8,346,278 B2 | 1/2013 | Wala et al. |
| 8,428,201 B1 | 4/2013 | McHann et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,929,288 B2 | 1/2015 | Stewart et al. |
| 9,621,293 B2 | 4/2017 | Hazani et al. |
| 2001/0036163 A1 | 11/2001 | Sabat et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0059437 A1 | 3/2005 | Son et al. |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |

(56) References Cited

U.S. PATENT DOCUMENTS

| | | |
|---|---|---|
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell et al. |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0144543 A1* | 6/2008 | Hunton ............... H04B 1/48 370/280 |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas et al. |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0316609 A1 | 12/2009 | Singh |
| 2009/0316611 A1 | 12/2009 | Stratford et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | Logalbo et al. |
| 2010/0041341 A1 | 2/2010 | Stratford |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |

(56) References Cited

U.S. PATENT DOCUMENTS

| | | |
|---|---|---|
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamaeki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0274021 A1 | 11/2011 | He et al. |
| 2011/0281536 A1 | 11/2011 | Lee et al. |
| 2012/0052892 A1 | 3/2012 | Braithwaite |
| 2012/0177026 A1 | 7/2012 | Uyehara et al. |
| 2013/0012195 A1 | 1/2013 | Sabat et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095870 A1 | 4/2013 | Phillips et al. |
| 2013/0107763 A1* | 5/2013 | Uyehara ............... H04B 7/024 370/278 |
| 2013/0165067 A1* | 6/2013 | DeVries ............... H04B 1/1036 455/307 |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2013/0272170 A1 | 10/2013 | Chatterjee et al. |
| 2014/0016583 A1 | 1/2014 | Smith |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2015/0131632 A1 | 5/2015 | Hazani et al. |
| 2017/0094679 A1 | 3/2017 | Lupescu et al. |

FOREIGN PATENT DOCUMENTS

| | | |
|---|---|---|
| CA | 2065090 A1 | 10/1992 |
| CA | 2242707 A1 | 1/1999 |
| CN | 101389148 A | 3/2009 |
| CN | 101547447 A | 9/2009 |
| CN | 201869169 U | 6/2011 |
| DE | 20104862 U1 | 8/2001 |
| DE | 10249414 A1 | 5/2004 |
| EP | 0461583 A1 | 12/1991 |
| EP | 0477952 A2 | 4/1992 |
| EP | 0851618 A2 | 7/1998 |
| EP | 0687400 B1 | 11/1998 |
| EP | 0993124 A2 | 4/2000 |
| EP | 1037411 A2 | 9/2000 |
| EP | 1056226 A2 | 11/2000 |
| EP | 1179895 A2 | 2/2002 |
| EP | 1227605 A2 | 7/2002 |
| EP | 1267447 A1 | 12/2002 |
| EP | 1347584 A2 | 9/2003 |
| EP | 1357683 A2 | 10/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1570626 A2 | 9/2005 |
| EP | 1693974 A1 | 8/2006 |
| EP | 1742388 A1 | 1/2007 |
| EP | 1942598 A2 | 7/2008 |
| EP | 1954019 A1 | 8/2008 |
| EP | 1968250 A1 | 9/2008 |
| EP | 2276298 A1 | 1/2011 |
| GB | 2323252 A | 9/1998 |
| GB | 2370170 A | 6/2002 |
| GB | 2399963 A | 9/2004 |
| GB | 2428149 A | 1/2007 |
| JP | 04-189036 A | 7/1992 |
| JP | 05-260018 A | 10/1993 |
| JP | 09-083450 A | 3/1997 |
| JP | 09-162810 A | 6/1997 |
| JP | 09-200840 A | 7/1997 |
| JP | 11-068675 A | 3/1999 |
| JP | 2000-152300 A | 5/2000 |
| JP | 2000-341744 A | 12/2000 |
| JP | 2002-264617 A | 9/2002 |
| JP | 2002-353813 A | 12/2002 |
| JP | 2003-148653 A | 5/2003 |
| JP | 2003-172827 A | 6/2003 |
| JP | 2004-172734 A | 6/2004 |
| JP | 2004-245963 A | 9/2004 |
| JP | 2004-247090 A | 9/2004 |
| JP | 2004-264901 A | 9/2004 |
| JP | 2004-265624 A | 9/2004 |
| JP | 2004-317737 A | 11/2004 |
| JP | 2004-349184 A | 12/2004 |
| JP | 2005-018175 A | 1/2005 |
| JP | 2005-087135 A | 4/2005 |
| JP | 2005-134125 A | 5/2005 |
| JP | 2007-228603 A | 9/2007 |
| JP | 2008-172597 A | 7/2008 |
| KR | 10-2001-0055088 A | 7/2001 |
| WO | 96/03823 A1 | 2/1996 |
| WO | 98/10600 A1 | 3/1998 |
| WO | 00/42721 A1 | 7/2000 |
| WO | 00/72475 A1 | 11/2000 |
| WO | 01/78434 A1 | 10/2001 |
| WO | 01/84760 A1 | 11/2001 |
| WO | 02/21183 A1 | 3/2002 |
| WO | 02/30141 A1 | 4/2002 |
| WO | 2002/102102 A1 | 12/2002 |
| WO | 03/24027 A1 | 3/2003 |
| WO | 03/98175 A1 | 11/2003 |
| WO | 2004/030154 A2 | 4/2004 |
| WO | 2004/047472 A1 | 6/2004 |
| WO | 2004/051322 A2 | 6/2004 |

(56) References Cited

FOREIGN PATENT DOCUMENTS

| WO | 2004/056019 A1 | 7/2004 |
|---|---|---|
| WO | 2004/059934 A1 | 7/2004 |
| WO | 2004/086795 A2 | 10/2004 |
| WO | 2004/093471 A2 | 10/2004 |
| WO | 2005/062505 A1 | 7/2005 |
| WO | 2005/069203 A2 | 7/2005 |
| WO | 2005/073897 A1 | 8/2005 |
| WO | 2005/079386 A2 | 9/2005 |
| WO | 2005/101701 A2 | 10/2005 |
| WO | 2005/111959 A2 | 11/2005 |
| WO | 2006/011778 A1 | 2/2006 |
| WO | 2006/018592 A1 | 2/2006 |
| WO | 2006/019392 A1 | 2/2006 |
| WO | 2006/039941 A1 | 4/2006 |
| WO | 2006/046088 A1 | 5/2006 |
| WO | 2006/051262 A1 | 5/2006 |
| WO | 2006/060754 A2 | 6/2006 |
| WO | 2006/077569 A1 | 7/2006 |
| WO | 2006/105185 A2 | 10/2006 |
| WO | 2006/133609 A1 | 12/2006 |
| WO | 2006/136811 A1 | 12/2006 |
| WO | 2007/048427 A1 | 5/2007 |
| WO | 2007/077451 A1 | 7/2007 |
| WO | 2007/088561 A1 | 8/2007 |
| WO | 2007/091026 A1 | 8/2007 |
| WO | 2008/008249 A2 | 1/2008 |
| WO | 2008/027213 A2 | 3/2008 |
| WO | 2008/033298 A2 | 3/2008 |
| WO | 2008/039830 A2 | 4/2008 |
| WO | 2008/076248 A1 | 6/2008 |
| WO | 2008/116014 A2 | 9/2008 |
| WO | 2009/012614 A1 | 1/2009 |
| WO | WO 2009/012614 A1 * | 1/2009 |
| WO | 2010/090999 A1 | 8/2010 |
| WO | 2010/132739 A1 | 11/2010 |
| WO | 2011/023592 A1 | 3/2011 |
| WO | 2011/100095 A1 | 8/2011 |
| WO | 2011/139939 A1 | 11/2011 |
| WO | 2012/148938 A1 | 11/2012 |
| WO | 2012/148940 A1 | 11/2012 |
| WO | 2012/151650 A1 | 11/2012 |
| WO | 2013/122915 A1 | 8/2013 |
| WO | 2015/029021 A1 | 3/2015 |

OTHER PUBLICATIONS

Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Zhao, "Optical Injection Locking on Vertical-Cavity Surface-Emitting Lasers (VCSELs): Physics and Applications," Fall 2008, PhD dissertation University of California at Berkeley, pp. 1-209.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Author Unknown, "Fiber Optic Distributed Antenna System," Installation and Users Guide, ERAU Version 1.5, May 2002, Andrews Corporation, 53 pages.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "Technical Specification Group Radio Access Network; Evolved Universal Terrestrial Radio Access (E-UTRA); Physical channels and modulation (Release 12)," Technical Specification 36.211, Version 12.7.0, 3GPP Organizational Partners, Sep. 2015, 136 pages.
Author Unknown, "VCSEL Chaotic Synchronization and Modulation Characteristics," Master's Thesis, Southwest Jiatong University, Professor Pan Wei, Apr. 2006, 8 pages (machine translation).
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Cho, Bong Youl et al. "The Forward Link Performance of a PCS System with an AGC," 4th CDMA International Conference and Exhibition, "The Realization of IMT-2000," 1999, 10 pages.
Chowdhury et al., "Multi-service Multi-carrier Broadband MIMO Distributed Antenna Systems for In-building Optical Nireless Access," Presented at the 2010 Conference on Optical Fiber Communication and National Fiber Optic Engineers Conference, Mar. 21-25, 2010, San Diego, California, IEEE, pp. 1-3.
Chrostowski, "Optical Injection Locking of Vertical Cavity Surface Emitting Lasers," Fall 2003, PhD dissertation University of California at Berkely, 122 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

(56) References Cited

OTHER PUBLICATIONS

International Preliminary Report on Patentability for PCT/IL2013/050671 dated Feb. 10, 2015, 6 pages.
International Search Report for PCT/IL2013/050671 dated Jan. 30, 2014, 3 pages.
International Search Report of the Internaitonal Searching Authority: PCT/IL2014/050526; dated Sep. 2, 2014; 3 Pages; European Patent Office.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Non-Final Office Action and Examiner-Initiated Interview Summary for U.S. Appl. No. 15/447,580, dated Aug. 2, 2017, 10 pages.
Non-final Office Action for U.S. Appl. No. 14/599,710, dated Jun. 20, 2016, 14 pages.
Non-Final Office Action for U.S. Appl. No. 15/049,663, dated Aug. 7, 2017, 20 pages.
Notice of Allowance and Examiner-Initiated Interview Summary for U.S. Appl. No. 14/599,710, dated Jan. 23, 2017, 9 pages.
Opatic, D., "Radio over Fiber Technology for Wireless Access," Ericsson, Oct. 17, 2009, 6 pages.
Patent Cooperation Treaty International Search Report for application No. PCT/IL2014/050526, dated Sep. 2, 2014, 3 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Pieros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals via Equalized Carrier/Sideband Filtering," Journal of Lightwave Technology, vol. 22, No. 4, IEEE, Apr. 2004, 8 pages.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-c-ellular-connectivity-indoors-demands-sophisticated-design.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.

\* cited by examiner

TIME-DIVISION DUPLEXING (TDD) IN DISTRIBUTED COMMUNICATIONS SYSTEMS, INCLUDING DISTRIBUTED ANTENNA SYSTEMS (DASS)

CROSS-REFERENCE TO RELATED APPLICATIONS

This application is a continuation of U.S. application Ser. No. 16/842,314, filed Apr. 7, 2020, which is a continuation of U.S. application Ser. No. 16/374,389, filed Apr. 3, 2019, now U.S. Pat. No. 10,694,519, which is a continuation of U.S. application Ser. No. 15/975,153, filed May 9, 2018, now U.S. Pat. No. 10,257,828, which is a continuation of U.S. application Ser. No. 14/962,338, filed Dec. 8, 2015, now U.S. Pat. No. 9,974,074, which is a continuation of International Application No. PCT/IL14/050526, filed Jun. 11, 2014, which claims the benefit of priority to U.S. Provisional Application No. 61/834,075, filed Jun. 12, 2013, all applications being incorporated herein by reference.

BACKGROUND

The technology of the disclosure relates to distributed antenna systems configured to provide communications signals over a communications medium to and from one or more remote units for communicating with client devices.

No admission is made that any reference cited herein constitutes prior art. Applicant expressly reserves the right to challenge the accuracy and pertinency of any cited documents.

Distributed antenna systems (DASs) are effective when deployed inside buildings or other environments where client devices may not otherwise receive radio-frequency (RF) signals from a base station or other source. DASs can be used to provide coverage for applications such as public safety, cellular telephony, wireless local access networks (LANs), location tracking, and medical telemetry inside buildings and over campuses. A typical DAS establishes a number of RF antenna coverage areas, also referred to as "antenna coverage areas." The antenna coverage areas are formed by remotely distributed antenna units (RAUs), which are sometimes referred to as remote units (RUs). A number of remote units are arranged to create an array of relatively small antenna coverage areas, with each RAU typically accommodating a small number of wireless client device users. This arrangement thus provides a uniform high quality signal and high throughput for wireless users.

Time-division duplexing (TDD) refers to duplex communication links where uplink is separated from downlink by the allocation of different time slots in the same frequency band. In TDD, users are allocated time slots for uplink and downlink transmission. When a DAS serves TDD wireless protocols, it must identify whether a radio source is transmitting (i.e., is in TDD Tx mode) or receiving (TDD Rx mode) and toggle its transmit/receive circuits accordingly. Conventional WiFi systems using TDD, for example, determine whether to toggle to TDD transmit (Tx) mode or stay in TDD receive (Rx) mode based on the output of a power detector that senses the power level at the radio port side of the DAS.

In this regard, FIG. 1 illustrates one such conventional system coupled to a radio source 10, such as a base station or transceiver. In FIG. 1, a TDD DAS head end 12 of a DAS 14 is provided. The TDD DAS head end 12 may also be a TDD repeater. The TDD DAS head end 12 receives TDD communications signals 16 in the form of TDD downlink communications signals 16D from the radio source 10 and provides TDD uplink communication signals 16U to the radio source 10. In the TDD DAS head end 12, a power detector 18 senses the power level of TDD communications signals 16 at the radio port side of the TDD DAS head end 12 to determine whether to toggle to TDD transmit (Tx) mode or stay in TDD receive (Rx) mode. The default status of the TDD DAS head end 12 is TDD receive (Rx) mode, where the DAS 14 is set to transfer signals in the uplink direction. When the power detector 18 detects power of the TDD communication signals 16 above a certain threshold, the assumption is that the power is sourced from TDD downlink communications signals 16D received from the radio source 10. This is because the power of the TDD downlink communications signal 16D is typically lower (e.g., 30-40 dB lower) than the power of the TDD uplink communications signals 16U due to loss. In response to the power detector 18 detecting power of the TDD communications signals 16 above a certain threshold, the TDD DAS head end 12 toggles input switch 20 and antenna switch 22 to TDD transmit (Tx) mode, where its circuits are set to transfer signals in the downlink direction.

One of the drawbacks of the DAS 14 in FIG. 1 is that the power generated by a receive (Rx) Amp 24 can leak through the directional coupler 26 to the power detector 18. For example, the directional coupler 26 may only have a directivity of up to 15 or 20 dB, but the difference in power between the TDD downlink communications signals 16D and the TDD uplink communications signals 16U may be greater than the directivity capability of the directional coupler 26. If power leaking from the receive (Rx) Amp 24 is high enough, it can cause the level comparator 28 to toggle the input switch 20 and the antenna switch 22 from TDD receive (Rx) mode to TDD transmit (Tx) mode even when the radio source 10 is not transmitting.

SUMMARY

Embodiments disclosed in the detailed description include time-division duplexing (TDD) in distributed communications systems, including distributed antenna systems (DAS s). Related circuits, systems, and methods are also disclosed. In one embodiment, a control circuit is provided in a TDD distributed communications system in the form of a TDD DAS, for example a TDD DAS head end. The control circuit is configured to control the TDD transmit mode of the DAS to control the allocation of time slots for uplink and downlink communications signal distribution in a respective uplink path(s) and downlink path(s). The control circuit includes separate power detectors configured to detect either a transmit power level in the downlink path or a receive power level in the uplink path. In this manner, the transmit power in the downlink path can be detected separately form the receive power in the uplink path. If the transmit power detected by a power detector in the downlink path is greater than the receive power detected by another power detector in the uplink path, the TDD transmit mode is switched to the downlink direction. In this manner, the control circuit does not have to rely on an assumption that the TDD transmit mode should be in uplink direction based solely on detected power in the downlink path, where a directional coupler may leak uplink power to the downlink path.

One embodiment of the disclosure relates to a control circuit controls switching in a system supporting time-division duplexing (TDD). The control circuit comprises a first power detector configured to determine a first power level from a radio source, a second power detector configured to determine a second power level in an uplink path, and a receive/transmit comparator. The receive/transmit comparator is coupled to the first power detector and to the second power detector, and compares the first power level to the second power level to provide an indication that the system should be switched to a TDD transmit mode when the first power level exceeds the second power level.

An additional embodiment of the disclosure relates to a distributed communication system capable of supporting time-division duplexing (TDD) comprises a central unit configured to receive a plurality of downlink signals from at least one radio source, a plurality of remote units each configured to receive downlink signals from the central unit, and to return uplink signals to the central unit, and a control circuit for controlling TDD switching in the distributed communication system. The control circuit comprises a first power detector configured to determine a first power level from the at least one radio source, a second power detector configured to determine a second power level from an uplink path, and a receive/transmit comparator. The receive/transmit comparator is coupled to the first power detector and to the second power detector, and compares the first power level to the second power level to provide an indication that the distributed communication system should be switched to a TDD transmit mode when the first power level exceeds the second power level.

The central units and remote units disclosed herein can be configured to support both RF communications services and digital data services. These communications services can be wired or wireless communications services that are typically communicated wirelessly, but may be provided over non-wireless medium (e.g., electrical conductor and/or optical fiber). The RF communications services and digital data services can be provided over any type of communications medium, including electrical conductors and optical fiber to wireless client devices, such as remote units for example. Examples of RF communications services are cellular services and radio communications services. Examples of digital data services include LAN using Ethernet, WLAN, WiMax, WiFi, Digital Subscriber Line (DSL), telephony, WCDMA, and LTE, which can support voice and data. Digital data signals can be provided over separate communications media for providing RF communications services, or over a common communications medium with RF communications signals.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both foregoing general description and the following detailed description are merely exemplary, and are intended to provide an overview or framework to understand the nature and character of the claims.

The accompanying drawings are included to provide a further understanding, and are incorporated into and constitute a part of this specification. The drawings illustrate one or more embodiment(s), and together with the description serve to explain principles and operation of the various embodiments.

DETAILED DESCRIPTION

Various embodiments will be further clarified by the following examples.

Figure 1:
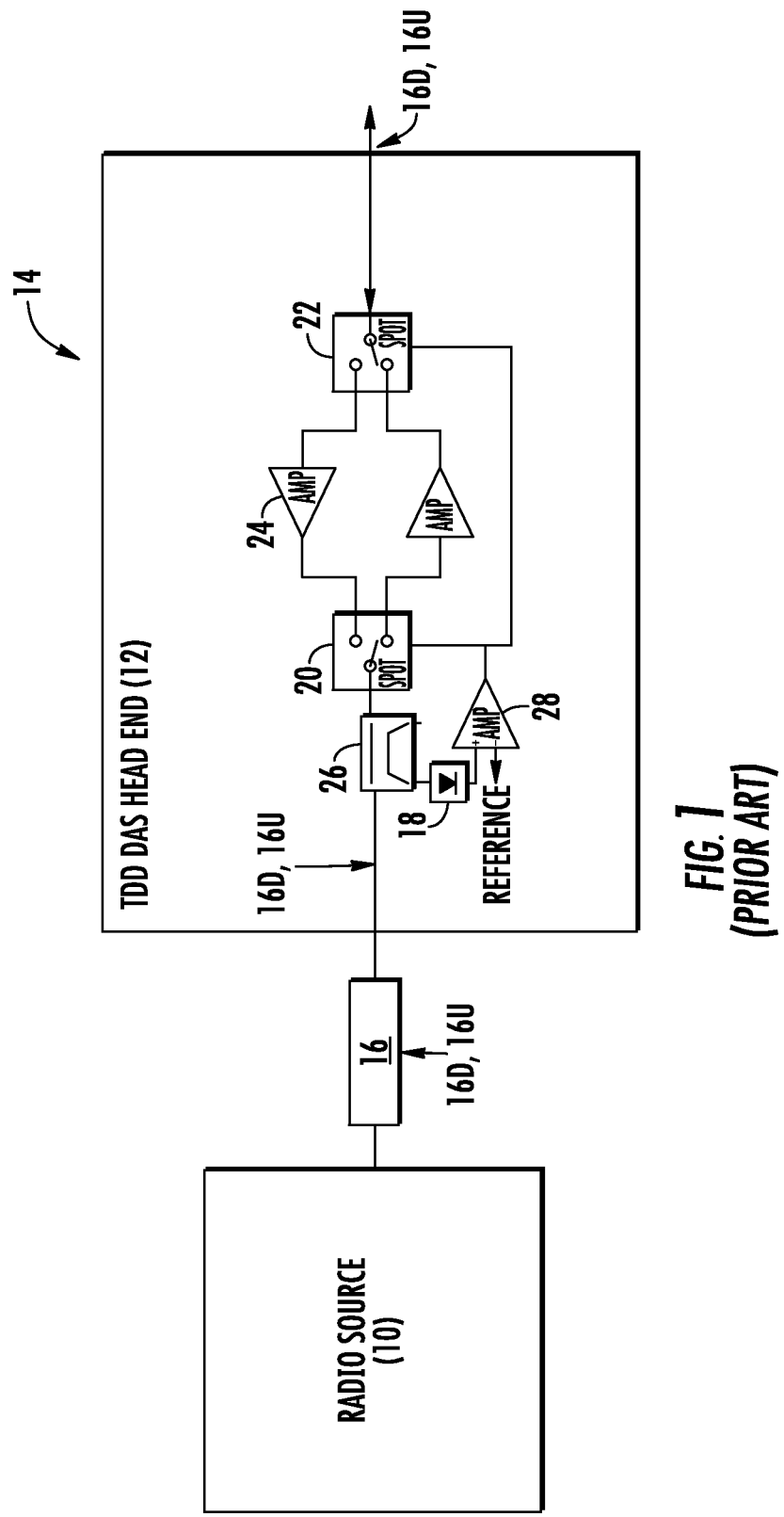
FIG. 1 is a schematic diagram of a prior art implementation of time-division duplexing (TDD)
Figure 2:
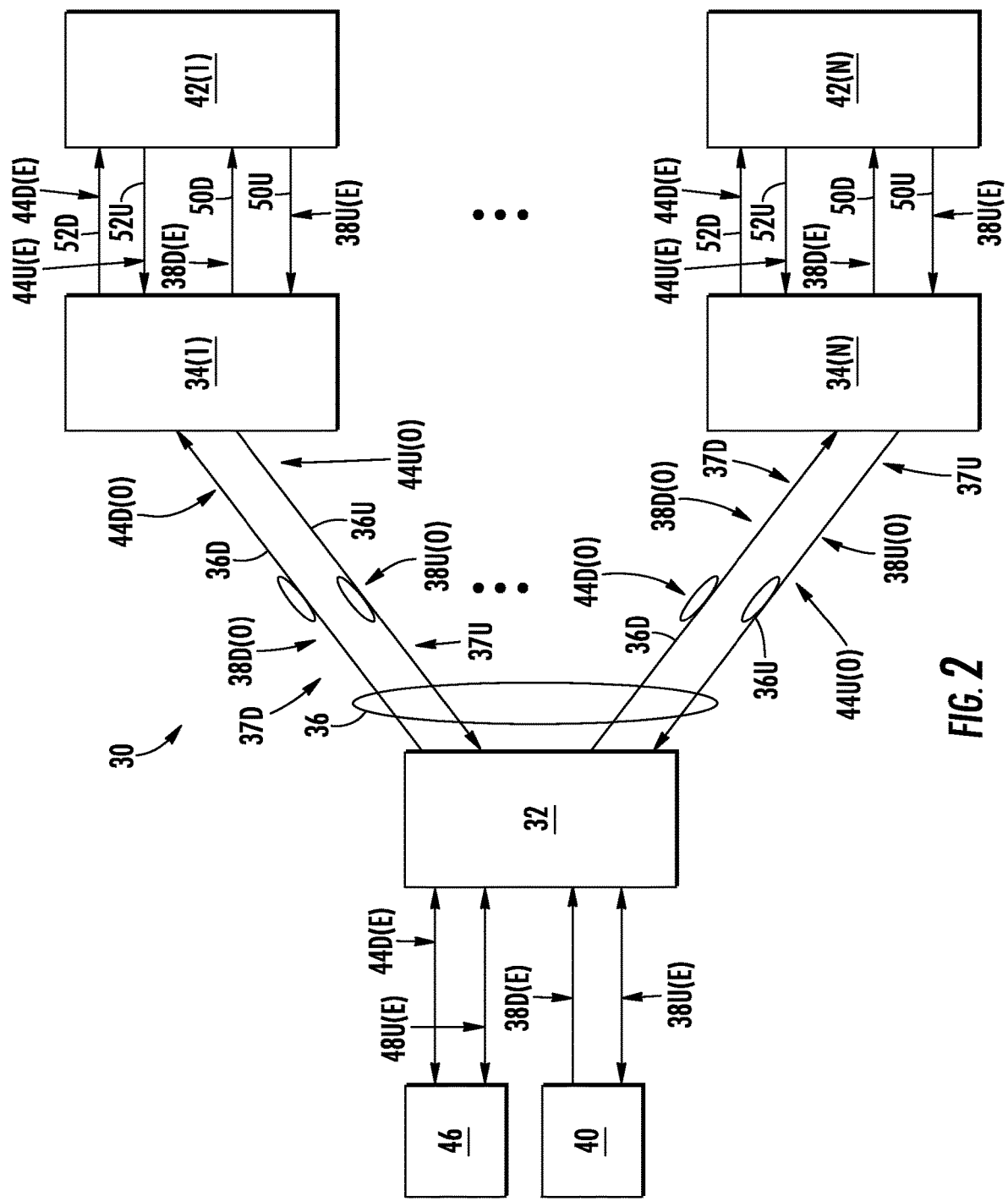
FIG. 2 is a schematic diagram of an exemplary point to multi-point optical fiber-based distributed antenna system configured to distribute radio-frequency (RF) communications services and management services.
Figure 3:
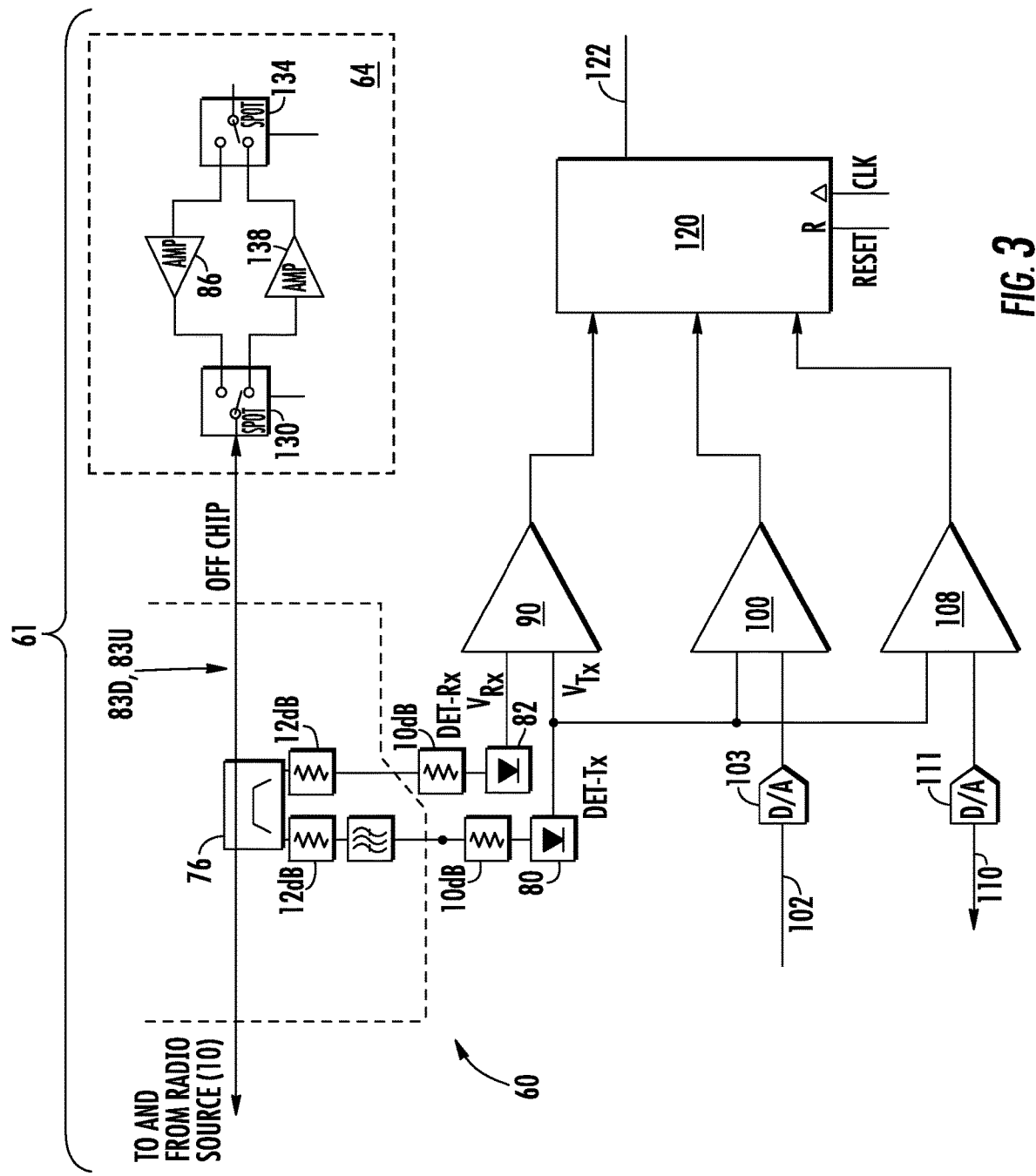
FIG. 3 illustrates a control circuit for controlling TDD switching in a distributed communication system according to one embodiment.

Before discussing a method of controlling time-division duplexing (TDD) switching in a distributed antenna system (DAS) with regard to FIG. 3, a general overview of a distributed communications system in the form of a DAS 30, in FIG. 2 is first provided. In this regard, the DAS 30 in FIG. 2 includes a central unit 32. The central unit 32 is communicatively coupled to one or more remote units 34(1)-34(N) via an optical fiber communications medium 36. Thus, in this example, the DAS 30 is an optical fiber-based distributed antenna system. However, the present disclosure is not limited to an optical fiber-based distributed antenna system. Other communications mediums including twisted pair conductors (e.g., CAT 5/6/7 cable) and coaxial cables could be employed or employed in conjunction with optical fiber. The DAS 30 is configured to distribute RF communications signals and management signals. In this regard, with regard to distribution of RF communications signals, the central unit 32 is configured to receive downlink communications signals 38D, which may be downlink RF communications signals, from a RF communications network, such as through a base station 40 as an example. In this embodiment, the downlink communications signals 38D are downlink electrical communications signals 38D(E). The downlink electrical communications signals 38D(E), which may be downlink electrical RF communications signals, can be combined and converted to downlink optical communications signals 38D(O), which may be downlink optical RF communications signals, by the central unit 32 in this embodiment. The downlink optical communications signals 38D(O) are split and distributed by the central unit 32 over at least one downlink optical fiber 36D to each of the remote units 34(1)-34(N) to provide one or more RF communications services to the client devices 42(1)-42(N) in wired and/or wireless communication with the remote units 14(1)-14(N).

With continuing reference to FIG. 2, the remote units 34(1)-34(N) convert the downlink optical communications signals 38D(O) back to downlink electrical communications signals 38D(E), and communicate the downlink electrical communications signals 38D(E) to one or more client devices 42(1)-42(N) to provide the one more RF communications services to the client devices 42(1)-42(N). The remote units 34(1)-34(N) can be configured to communicate through wired or wireless communications to the client devices 42(1)-42(N). For example, if the remote units 34(1)-34(N) are configured to be directly coupled to one client device 42(1)-42(N) each, up to 'N' client devices 42(1)-42(N) may be connected to the remote units 34(1)-34(N) in the DAS 30.

The remote units 34(1)-34(N) are also configured to receive uplink communications signals 38U, which may be uplink RF communications signals, from the client devices 42(1)-42(N) to be distributed to the central unit 32 and the base station(s) 40. The uplink communications signals 38U are received from the client devices 42(1)-42(N) as uplink electrical communications signals 38U(E), which may be uplink electrical RF communications signals, which are combined and converted to uplink optical communications signals 38U(O), which may be uplink optical RF communications signals. The remote units 34(1)-34(N) distribute the uplink communications signals 38U(O) over at least one uplink optical fiber 36U to the central unit 32. The central unit 32 receives and converts the uplink optical communications signals 38U(O) back to uplink electrical communications signals 38U(E). The central unit 32 provides the uplink electrical communications signals 38U(E) to the base station(s) 40 to support the one or more RF communications services from the client devices 42(1)-42(N).

With continuing reference to FIG. 2, note that one common downlink optical fiber 36D may be provided between the central unit 32 and the remote units 34(1)-34(N) to carry downlink communications signals in a point-to-multipoint communications configuration. Similarly, one common uplink optical fiber 36U may be provided between the central unit 32 and the remote units 34(1)-34(N) to carry uplink communications signals in a point-to-multipoint communications configuration. Bi-directional communications in the downlink and uplink directions are provided in this embodiment of the DAS 30 in FIG. 2 by providing separate downlink optical fiber(s) 36D and uplink optical fiber(s) 36U in a respective downlink path 37D and uplink path 37U. Further, due to the point-to-multipoint configuration of the DAS 30 in FIG. 2, the embodiments disclosed provide time-division multiplexing (TDM) of management signals distributed in the DAS 30 to ensure that the management signals do not interfere with providing bi-directional, full-duplex communications. Alternatively, individual downlink optical fibers 36D may be provided between the central unit 32 and each remote unit 34(1)-34(N) to carry downlink communications signals in a point-to-point communications configuration. The individual uplink optical fibers 36U may be provided between the central unit 32 and each remote unit 34(1)-34(N) to carry uplink communications signals in a point-to-point communications configuration.

As a further option, the downlink optical fiber 36D and uplink optical fiber 36U could be provided as a single optical fiber (not shown) to carry both downlink and uplink signals. Time-division multiplexing of the downlink and uplink signals may be employed to allow the downlink and uplink signals to be communicated over a single optical fiber. Wave-division multiplexing (WDM), such as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety, may also be employed in this scenario to prevent collisions between downlink and uplink communications signals in the same or overlapping frequency bands. Further, U.S. patent application Ser. No. 12/892,424 also discloses distributed digital data communications signals in a distributed antenna system which may also be distributed in the DAS 30 either in conjunction with RF communications signals or not.

With reference back to FIG. 2, the central unit 32 of the DAS 30 is also configured to distribute management signals between one or more sources, such as between a management controller 46, and the remote units 34(1)-34(N). The management controller 46 may be a computer or console as non-limiting examples. For example, the management controller 46 may be configured to provide management signals to perform a variety of tasks or applications. Examples of management signals that may be distributed in the DAS 30 include configuration signals, control signals, gain control signals, monitoring signals, and configuration signals, fault signals, and alarm signals. The management signals are not for providing RF communications services between the base station(s) 40 and the client devices 42(1)-42(N). The management signals may be communicated according to any protocol desired, such as the Ethernet protocol.

The central unit 32 is configured to receive downlink management signals 44D from the management controller 46. The central unit 32 distributes the downlink management signals 44D to the remote units 34(1)-34(N) to be distributed to the client devices 42(1)-42(N) communicatively coupled to the remote units 34(1)-34(N). The management controller 46 provides downlink management signals 44D to be distributed by the central unit 32 to any number of remote units 34(1)-34(N). Thus, to prevent the downlink management signals 44D destined for different remote units 34(1)-34(N) from interfering with each other, the central unit 32 time-division multiplexes the downlink electrical management signals 44D(E) into individual time slots in a downlink TDM management frame signal to be distributed to the remote units 34(1)-34(N). The central unit 32 converts the downlink TDM electrical management signal to downlink TDM optical management signals 44D(O) to be distributed over the at least one downlink optical fiber 36D to the remote units 34(1)-34(N) and the client devices 42(1)-42(N) in this embodiment. The central unit 32 can be configured to either broadcast all downlink electrical management signals 44D(E) to all remote units 34(1)-34(N), or provide specific downlink electrical management signals 44D(E) to individual remote units 34(1)-34(N).

In this embodiment, as will be described in more detail below, the downlink TDM optical management signals 44D(O) are combined with the downlink optical communications signals 38D(O) in different frequency bands and distributed over the same downlink optical fiber 36D. The remote units 34(1)-34(N) are configured to receive and convert downlink TDM optical management signals 44D(O) to downlink TDM electrical management signals, which can then be parsed by each remote unit 34(1)-34(N) to receive a particular downlink electrical management signal 44D(E) destined for the remote unit 34(1)-34(N).

The remote units 34(1)-34(N) are also configured to create and provide uplink management signals 44U to be distributed to the central unit 32 and the management controller 46. For example, it may be desired for the remote units 34(1)-34(N) to have the ability to provide the same type of management signals described above to the central unit 32, which are not related to RF communications services provided to the base station(s) 40. In this regard, uplink electrical management signals 44U(E) may be provided by the client devices 42(1)-42(N) to the remote units 34(1)-34(N). The remote units 34(1)-34(N) time-division multiplex the uplink electrical management signals 44U(E) into individual time slots in an uplink TDM electrical management frame signal. Thus, the management signals received by the central unit 32 from different remote units 34(1)-34(N) do not interfere with each other. The remote units 34(1)-34(N) combine the received uplink TDM electrical management signals with uplink electrical communications signals 38U (E), and are then configured to convert the combined uplink TDM electrical management signals and uplink electrical communications signals 38U(E) to combined uplink TDM optical management signals 44U(O) and uplink optical communications signals 38U(O) to be distributed over the at least one uplink optical fiber 36U to the central unit 32.

With continuing reference to FIG. 2, the central unit 32 is configured to convert the received combined uplink TDM optical management signals 44U(O) and uplink optical communications signal 38U(O) into combined uplink TDM electrical management signals 44U(E) and uplink electrical communications signal 38U(E). The central unit 32 then splits the uplink TDM electrical management signals 44U(E) from the uplink electrical communications signals 38U(E). The central unit 32 is configured to translate the uplink TDM electrical management signals 44U(E) into individual uplink electrical management signals 48U(E) from the different remote units 34(1)-34(N) and provide the uplink electrical management signals 48U(E) to the management controller(s) 46.

With continuing reference to FIG. 2, the remote units 34(1)-34(N) in the DAS 30 are communicatively coupled to the client devices 42(1)-42(N) by a separate electrical RF communications medium 50 and an electrical management communications medium 52. In this embodiment, the electrical RF communications medium 50 includes a separate downlink electrical RF communications medium 50D and an uplink electrical RF communications medium 50U. Alternatively, the downlink electrical RF communications medium 50D and uplink electrical RF communications medium 50U may be provided as a single electrical RF communications medium that carries both downlink and uplink RF communications signals. The electrical management communications medium 52 in FIG. 2 also includes a separate downlink electrical management communications medium 52D and an uplink electrical management communications medium 52U. Alternatively, the downlink electrical management communications medium 52D and the uplink electrical management communications medium 52U may be provided as a single electrical management communications medium that carries both downlink and uplink management communications signals. The electrical management communications mediums 50, 52 may be coaxial cables, for example.

In the present embodiments, the downlink optical fiber 36D and uplink optical fiber 36U could be provided as a single optical fiber to carry combined downlink optical communications signals 38D(O), downlink electrical TDM management frame signals 44D(O), uplink TDM optical management signals 44U(O), and uplink optical communications signals 38U(O). Time-division multiplexing of the downlink and uplink signals may be employed to allow these downlink and uplink signals to be communicated over a single optical fiber. Wave-division multiplexing (WDM), such as discussed in U.S. patent application Ser. No. 12/892,424, incorporated herein by reference in its entirety, may also be employed in this scenario to prevent collisions between downlink and uplink communications signals in the same or overlapping frequency bands.

FIG. 3 illustrates a control circuit 60 used to control toggling between transmit and receive mode in a system, such as a DAS, supporting time-division duplexing (TDD). The control circuit 60 can be used with, for example, distributed antenna systems, repeaters, and other hardware and architectures that provide wireless services. The control circuit 60 can be interposed, for example, between a radio source, such as a base station, and head end equipment of a distributed antenna system. The control circuit 60 can also be integrated into one or more components of a distributed antenna system, including head end equipment. For the purposes of illustration, the control circuit 60 is described below in the context of a distributed antenna system, although other implementations will be recognized by those of skill in the art. The control circuit 60 can include, or can be coupled to, a TDD switching circuit 64.

Still referring to FIG. 3, the control circuit 60 in this example is provided in a distributed communications system in the form of a DAS 61 in this example. The control circuit 60 includes a directional coupler 76 and two power detectors 80, 82. The transmit (Tx) power detector 80 measures Tx power, in decibels (dB), arriving in the downlink direction on a downlink path 83D, such as from the radio source 10, which is an indication of the power level received in the downlink direction on a downlink path 83D. The receive (Rx) power detector 82 measures Rx power, in dBm, generated by a Receive (Rx) amplifier 86, which is an indication of the power level received in the uplink direction on an uplink path 83U. Power received 'from the uplink direction' on the uplink path 83U can come from a system serviced by the radio source 10, such as from a DAS or a repeater. The decision by the control circuit 60 to toggle between the TDD Tx mode and TDD Rx mode is based on a comparison of the power level received from the radio source 10 and the power level received from the DAS 61. The Tx power detector 80 and the Rx power detector 82 may be provided in the form of diodes, as a non-limiting example.

The Tx/Rx comparator 90 makes the determination of whether the Tx power from the radio source 10 in the downlink path 83D is higher than the Rx power in the uplink path 83U. A Tx power higher than Rx power is one condition for toggling the TDD transmission mode to TDD Tx mode. In this example, the default TDD transmission mode for the control circuit 60 is TDD Rx mode, and a Tx power in excess of Rx power does not necessarily toggle the TDD transmission mode from TDD Rx mode to TDD Tx mode. Tx power can also be required to exceed a minimum threshold value to effect a switching, which is determined by a Transmit (Tx) power comparator 100. The threshold value can be variable and established to a desired level by a Tx power reference 102. A digital-to-analog converter (DAC) 103 may be included to convert the Tx power reference 102 from a digital signal to an analog signal if the Tx power comparator 100 is an analog comparator.

A Tx saturation comparator 108 compares the detected Tx power to a saturation level reference 110. A digital-to-analog converter (DAC) 111 may be included to convert the saturation level reference 110 from a digital signal to an analog signal if the Tx saturation comparator 108 is an analog comparator. The Tx saturation comparator 108 addresses situations in which the Tx power detector 80 is saturated due to high Tx power, and as a result the power levels measured by Tx power detector 80 and the Rx power detector 82 might be seen as equal. This condition might cause an error in toggling from TDD Tx mode to TDD Rx mode, or vice versa. If the output of the Tx saturation comparator 108 is "1", the assumption is that the Tx power detector 80 is saturated due to high power arriving from the radio source. In this case, the logic circuit 120 decides that the DAS should be toggled to TDD Tx mode.

The Rx amplifier 86, an input switch 130, an antenna switch 134, and a Transmit (Tx) amplifier 138 are illustrated as forming the TDD switching circuit 64 to effect the TDD Tx mode and TDD Rx mode in the system. Based on the state of the three comparators 90, 100, 108, the logic 120 decides if the switching circuit 64 will set the DAS to TDD Tx mode or TDD Rx mode. The logic circuit 120 schedules the toggling of the input switch 130 and the antenna switch 134. In order to avoid a situation where the antenna switch 134 is toggled under power when toggling from TDD Rx mode to TDD Tx mode, the logic circuit 120 first toggles the antenna switch 134 and then the input switch 130.

The logic circuit 120 can have three states based on the outputs of the comparators 90, 100, 108. A first state can correspond to when the receive/transmit comparator 90 determines that Rx power exceeds Tx power. In the first state, the switching circuit 64 receives an instruction through, for example, a digital control bit, "1" for TDD Tx mode, and "0" for TDD Rx mode, to maintain the DAS in receive mode. For example, the instruction may be provided on a Tx/Rx sense output 122 from the logic circuit 120. The logic circuit 120 may have more than one Tx/Rx sense output 122 if there is a need for other system in the DAS 61 to be switched between TDD Tx mode and TDD Rx mode. The outputs of the comparators 100, 108 are not relevant in this state. In the second state, the receive/transmit comparator 90 determines that Tx power exceeds Rx power, but the Tx power comparator 100 determines that Tx power does not exceed the Tx power reference 102. In the second state, the TDD switching circuit 64 is instructed to operate the DAS in receive mode. In the third state, if the Tx power is higher than the Rx power and the Tx power is higher than the Tx reference value, the TDD switching circuit 64 is instructed to operate the DAS in transmit mode. If the output of the Tx saturation comparator 108 is "1", indicating that the Tx power detector 80 is saturated due to high power arriving from the radio source 10, the switching circuit 64 is instructed to operate the DAS in transmit mode.

According to one aspect of the present embodiments, a simple and robust mechanism provides a simple and robust switching of a DAS, repeater, or similar component between TDD uplink (Rx) mode and TDD downlink (Tx) mode. The exemplary control circuit 60 uses simple components without a need for an expensive high directivity directional coupler required by conventional schemes.

The digital reference 102 and the saturation level reference 110 may be, for example, digital words that can be set digitally by software commands. The exemplary comparators are shown as comparators 90, 100, 108, although other components might be used. The exemplary power detectors 80, 82 are illustrated as diodes, although other components might be used.

The RF communications services supported by the distributed antenna systems disclosed in this application, such as the DAS 14, 30, or 61 may include, but are not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, WLAN, WiMax, WiFi, Digital Subscriber Line (DSL), and LTE, etc.

Figure 4:
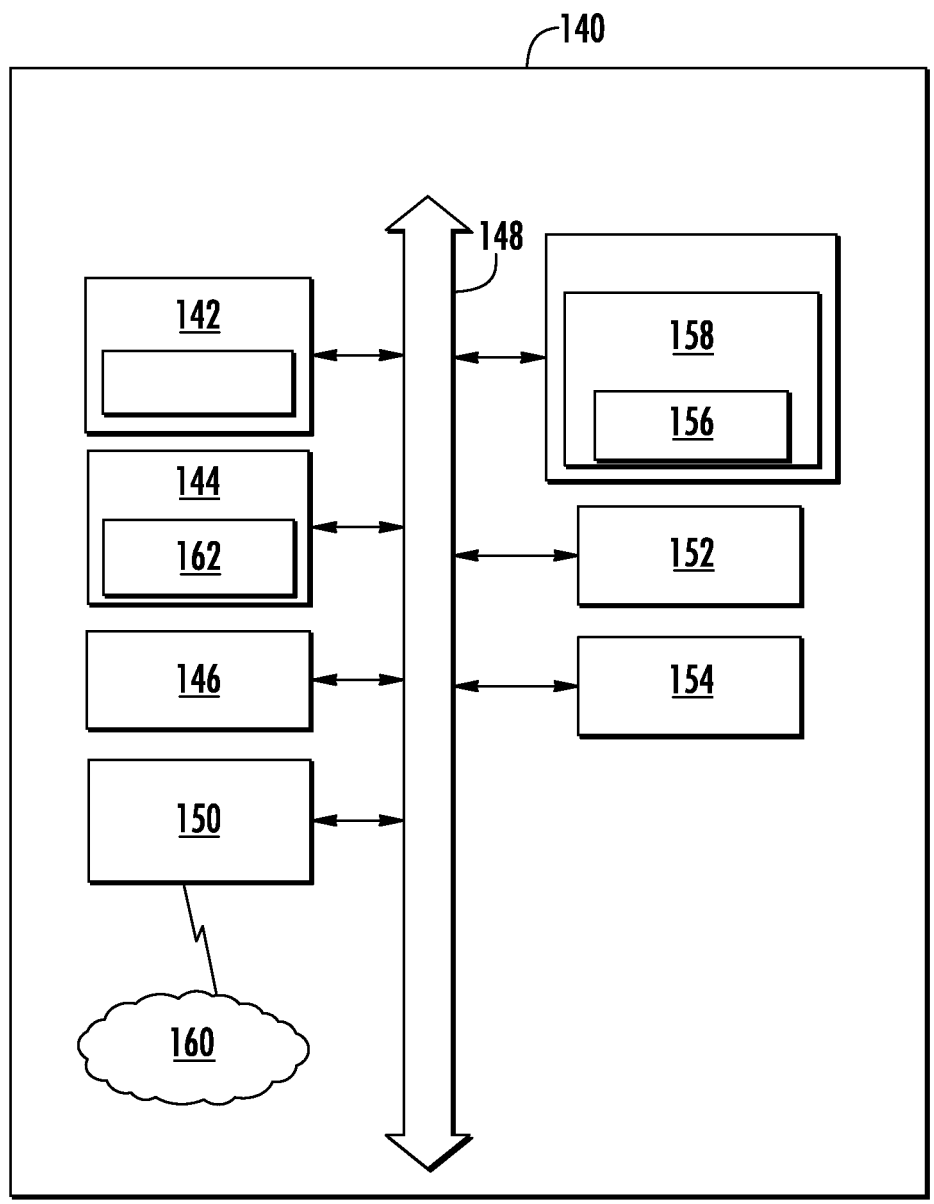
FIG. 4 is a schematic diagram of a generalized representation of an exemplary computer system that can be included in or interface with any of the exemplary distributed antenna systems and/or their components described herein, wherein the exemplary computer system is adapted to execute instructions from an exemplary computer-readable media.

Any of the distributed communications systems and/or DAS components disclosed herein, including but not limited to the control circuit 60 in FIG. 3, can include a computer system. For example, the logic circuit 120 of the control circuit 60 in FIG. 3 may be implemented in a computer system that includes a microprocessor or other controller that is configured to execute software to control the TDD transmission mode. In this regard, FIG. 4 is a schematic diagram representation of additional detail regarding an exemplary form of a computer system 140 that is adapted to execute instructions from a computer-readable medium to perform power management functions and can be included in a distributed antenna system component(s). The computer system 140 includes a set of instructions for causing the distributed antenna system component(s) to provide its designed functionality. The DAS component(s) may be connected (e.g., networked) to other machines in a LAN, an intranet, an extranet, or the Internet. The DAS component(s) may operate in a client-server network environment, or as a peer machine in a peer-to-peer (or distributed) network environment. While only a single device is illustrated, the term "device" shall also include any collection of devices that individually or jointly execute a set (or multiple sets) of instructions to perform any one or more of the methodologies discussed herein. The DAS component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer. The exemplary computer system 140 in this embodiment includes a processing device or processor 142, a main memory 144 (e.g., read-only memory (ROM), flash memory, dynamic random access memory (DRAM) such as synchronous DRAM (SDRAM), etc.), and a static memory 146 (e.g., flash memory, static random access memory (SRAM), etc.), which may communicate with each other via the data bus 148. Alternatively, the processing device 142 may be connected to the main memory 144 and/or static memory 146 directly or via some other connectivity means. The processing device 142 may be a controller, and the main memory 144 or static memory 146 may be any type of memory.

The processing device 142 represents one or more general-purpose processing devices such as a microprocessor, central processing unit, or the like. More particularly, the processing device 142 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 142 is configured to execute processing logic in instructions 162 for performing the operations and steps discussed herein.

The computer system 130 may further include a network interface device 140. The computer system 130 also may or may not include an input 142 to receive input and selections to be communicated to the computer system 130 when executing instructions. The computer system 130 also may or may not include an output 144, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 140 may or may not include a data storage device that includes instructions 156 stored in a computer-readable medium 158. The instructions 156 may also reside, completely or at least partially, within the main memory 144 and/or within the processing device 142 during execution thereof by the computer system 140, the main memory 144 and the processing device 142 also constituting computer-readable medium. The instructions 156 may further be transmitted or received over a network 160 via the network interface device 150.

While the computer-readable medium 158 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. Storage media may be coupled to the processor such that the processor can read information from, and write information to, the storage medium, or integral to the processor. The processor and the storage medium may reside in an ASIC. The ASIC may reside in a remote station as discrete components in a remote station, base station, or server.

As used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers.

We claim:

1. A control circuit for controlling switching between a time-division duplexing (TDD) transmit mode and a TDD receive mode in a wireless communications system supporting TDD, the control circuit comprising:
   a first power detector configured to determine a first power level in a downlink direction on a downlink optical path;
   a second power detector configured to determine a second power level in an uplink direction on an uplink optical path;
   a receive/transmit comparator coupled to the first power detector and to the second power detector, wherein the receive/transmit comparator compares the first power level to the second power level to provide a first indication that the system should be switched to TDD transmit mode when the first power level exceeds the second power level;
   a second power comparator configured to determine a second indication indicative of whether the first power level exceeds a value of a transmit power reference; and
   a logic circuit configured to determine if the system should be switched to TDD transmit mode or TDD receive mode based at least in part on a received first indication from the receive/transmit comparator and a received second indication from the second power comparator, wherein
      the logic circuit has a first state in which the second power level exceeds the first power level to indicate TDD receive mode, and
      the logic circuit has a second state in which the first power level exceeds the second power level.

2. The control circuit of claim 1, wherein the logic circuit has a third state in which the first power level exceeds the second power level and the value of the transmit power reference to indicate TDD transmit mode.

3. The control circuit of claim 2, wherein the receive/transmit comparator and the second power comparator have as an input an output of the first power detector.

4. The control circuit of claim 1, wherein the receive/transmit comparator and the second power comparator have as an input an output of the first power detector.

5. The control circuit of claim 1, further comprising a TDD switching circuit configured to effect the TDD transmit mode and the TDD receive mode for the system, and a directional coupler configured to receive and transmit communications between the TDD switching circuit and a radio source.

6. A control circuit for controlling switching between a time-division duplexing (TDD) transmit mode and a TDD receive mode in a wireless communications system, the control circuit comprising:
   a first power detector configured to determine a first power level in a downlink direction on a downlink optical path;
   a second power detector configured to determine a second power level in an uplink direction on an uplink optical path;
   a receive/transmit comparator coupled to the first power detector and to the second power detector, wherein the receive/transmit comparator compares the first power level to the second power level to provide a first indication that the system should be switched to TDD transmit mode when the first power level exceeds the second power level;
   a second power comparator configured to determine a second indication indicative of whether the first power level exceeds a value of a transmit power reference;
   a logic circuit coupled to the receive/transmit comparator for receiving the first indication and configured to receive the second indication, wherein the logic circuit is configured to determine if the system should be switched to TDD transmit mode or TDD receive mode based at least in part on the received first indication from the receive/transmit comparator and the received second indication from the second power comparator; and
   a TDD switching circuit configured to effect the TDD transmit mode and the TDD receive mode.

7. The control circuit of claim 6, further comprising a saturation comparator configured to provide a third indication of saturation of the first power detector by comparing the first power level with a saturation level reference, the logic circuit coupled to the saturation comparator for receiving the third indication, wherein the logic circuit is configured to determine if the system should be switched to TDD transmit mode or TDD receive mode based at least in part on the received third indication of saturation from the saturation comparator.

8. The control circuit of claim 6, wherein the logic circuit has a first state in which the second power level exceeds the first power level to indicate TDD receive mode.

9. The control circuit of claim 8, wherein the logic circuit has a second state in which the first power level exceeds the second power level and the first power level does not exceed the value of the transmit power reference to indicate TDD receive mode.

10. The control circuit of claim 9, wherein the logic circuit has a third state in which the first power level exceeds the second power level and the value of the transmit power reference to indicate TDD transmit mode.

11. The control circuit of claim 8, further comprising a saturation comparator configured to provide a third indication of saturation of the first power detector by comparing the first power level with a saturation level reference, the logic circuit configured to receive the third indication, wherein the logic circuit is configured to determine if the system should be switched to TDD transmit mode or TDD receive mode.

12. A control circuit for controlling switching between a time-division duplexing (TDD) transmit mode and a TDD receive mode in a system supporting TDD in a wireless communications system, the control circuit comprising:
   a first power detector configured to determine a first power level in a downlink direction on a downlink optical path;
   a second power detector configured to determine a second power level in an uplink direction on an uplink optical path;
   a receive/transmit comparator configured to compare the first power level to the second power level to provide a first indication that the system should be switched to TDD transmit mode when the first power level exceeds the second power level;
   a second power comparator configured to determine a second indication indicative of whether the first power level exceeds a value of a transmit power reference;
   a logic circuit coupled to receive the first indication, the logic circuit coupled to the second power comparator for receiving the second indication, wherein the logic circuit is configured to determine if the system should be switched to TDD transmit mode or TDD receive mode based at least in part on the received first indication from the receive/transmit comparator and the received second indication from the second power comparator; and
   a saturation comparator configured to provide a third indication of saturation of the first power detector.

13. The control circuit of claim 12, wherein the logic circuit is coupled to the saturation comparator for receiving the third indication, wherein the logic circuit is configured to determine if the system should be switched to TDD transmit mode or TDD receive mode based at least in part on the received third indication of saturation from the saturation comparator.

14. The control circuit of claim 12, wherein the receive/transmit comparator and the second power comparator have as an input an output of the first power detector.

15. The control circuit of claim 12, wherein the logic circuit has a first state in which the second power level exceeds the first power level to indicate TDD receive mode.

16. The control circuit of claim 13, wherein the receive/transmit comparator and the second power comparator have as an input an output of the first power detector, and the logic circuit has a first state in which the second power level exceeds the first power level to indicate TDD receive mode.

17. A control circuit for controlling switching between a time-division duplexing (TDD) transmit mode and a TDD receive mode in a wireless communications system, the control circuit comprising:
   a first power detector configured to determine a first power level in a downlink direction on a downlink optical path;
   a second power detector configured to determine a second power level in an uplink direction on an uplink optical path;
   a receive/transmit comparator coupled to the first power detector to compare the first power level to the second power level to provide a first indication that the system should be switched to TDD transmit mode when the first power level exceeds the second power level;
   a second power comparator configured to determine a second indication indicative of whether the first power level exceeds a value of a transmit power reference; and
   a logic circuit coupled to the receive/transmit comparator for receiving the first indication, the logic circuit coupled to the second power comparator for receiving the second indication, wherein the logic circuit is configured to determine if the system should be switched to TDD transmit mode or TDD receive mode based at least in part on the received first indication from the receive/transmit comparator and the received second indication from the second power comparator, wherein the receive/transmit comparator and the second power comparator have as an input an output of the first power detector.

18. The control circuit of claim 17, further comprising a TDD switching circuit configured to effect the TDD transmit mode and the TDD receive mode for the system.

19. The control circuit of claim 18, wherein the TDD switching circuit comprises an input switch and an antenna switch located upstream and downstream the downlink optical path, respectively.

20. The control circuit of claim 19, wherein the TDD switching circuit comprises a transmit amplifier and a receive amplifier located between the input switch and the antenna switch.

* * * * *